United States Patent

Ishimaru et al.

[11] Patent Number: 5,921,685
[45] Date of Patent: Jul. 13, 1999

[54] TAPERED ROLLER BEARING FOR VEHICLE

[75] Inventors: Akira Ishimaru; Takaaki Shiratani, both of Fujisawa, Japan

[73] Assignee: NSK Ltd., Tokyo, Japan

[21] Appl. No.: 08/943,503

[22] Filed: Oct. 3, 1997

[51] Int. Cl.[6] .................................................. F16C 33/58
[52] U.S. Cl. .......................... 384/564; 384/565; 384/571; 384/450
[58] Field of Search ................................. 384/571, 564, 384/569, 450, 565

[56] References Cited

U.S. PATENT DOCUMENTS

| | | | |
|---|---|---|---|
| 3,951,483 | 4/1976 | Nakamura | 384/571 |
| 4,915,513 | 4/1990 | Orain | 384/571 |
| 5,549,398 | 8/1996 | Van Brakel et al. | 384/571 |

*Primary Examiner*—Lenard A. Footland
*Attorney, Agent, or Firm*—Helfgott & Karas, PC

[57] ABSTRACT

With the size precision suitable for mass production, the time and labor required for running-in of various rotating machine and apparatus such as a gear box with the bearing installed are reduced.

A clearance 13 exists between the end face on the larger diameter side and the inner face 7a of the larger flange portion 7 in the state where the end face on the smaller diameter side of the tapered rollers 3 is abutted to the inner face 6a of the smaller flange portion 6. The minimum value of the size $\Delta L$ of the clearance 13 is kept up to 0.3 mm. Simultaneously, the difference between the maximum value and the minimum value in the length L of the tapered rollers 3 is kept up to 0.15 mm.

1 Claim, 4 Drawing Sheets

TAPERED ROLLER BEARING FOR VEHICLE

INDUSTRIAL FIELD OF THE INVENTION

This invention is related to a tapered roller bearing for an automobile which is utilized for example to rotatably support a shaft when installed in the gear box (transmission) of the automobile, or to rotatably support a vehicle wheel when installed in the suspension apparatus of the automobile.

DESCRIPTION OF THE PRIOR ART

The tapered roller bearing with tapered rollers installed in it is capable of supporting radial load and axial load, and its bearing load is large, and therefore it is utilized in the various rotating support portions to which a large load is applied. Such a tapered roller bearing is comprised of, as shown in FIG. 1, an outer ring 1 and an inner ring 2 arranged concentric with each other, and a plurality of tapered rollers 3, 3 rotatebly provided between the outer ring 1 and the inner ring 2. The outer ring 1 has an inner peripheral surface on which an outer ring raceway 4 of a tapered concave shape is formed. And, the inner ring 2 has an outer peripheral surface on which an inner ring raceway 5 of a tapered convex shape is formed, and the inner ring raceway 5 has a smaller flange portion 6 on the end portion on the smaller diameter side and a larger flange portion 7 on the end portion on the larger diameter side. In addition, the tapered rollers 3, 3 are rotatably retained and guided by the retainer 8 between the outer ring raceway 4 and the inner ring raceway 5.

The tapered roller bearing 9 as mentioned above is mounted, for example as shown in FIG. 2, between the inner peripheral surface of the housing 10 and the outer peripheral surface of the rotatable shaft 11 with the outer ring 1 fitted into the housing 10 and with the inner ring 2 fitted onto the rotatable shaft 11. In the state where the tapered roller bearing 9 is mounted, when a radial or axial load is applied to the rotatable shaft 11, the load in either direction is supported by the tapered rollers 3, 3, so that the relative rotation between the rotatable shaft 11 and the housing 10 is smoothly carried on.

When assembling the tapered roller bearing 9 as constructed and used as mentioned above, it is carried out as shown in FIG. 3. Specifically, first the tapered rollers 3, 3 held by the retainer 8 is combined with the inner ring 2, and the tapered rollers 3, 3 are installed in the outer ring 1. When the tapered rollers 3, 3 held by the retainer 8 is combined with the inner ring 2, the both members 3, 2 are combined with each other with the smaller flange portion 6 placed below. Upon this combining operation, the tapered rollers 3, 3 held in the free condition by the retainer 8 are displaced in the pocket 12 of the retainer 8, and not aligned in the normal position. In addition, the relation between the tapered rollers 3, 3 and the inner ring 2 is provided in a state such that the end face on the tail portion side (smaller diameter side) of each of the tapered rollers 3, 3 is abutted to the inner face 6a of the smaller flange portion 6 of the inner ring 2 with a clearance 13 provided between the end face of the head portion side (larger diameter side) of each of the tapered rollers 3, 3 and the inner face 7a of the larger flange portion 7 of the inner ring 2. When the tapered rollers 3, 3 in that state are installed in the outer ring 1, as shown in FIG.4, this assembling is carried out with the clearance 13 provided between the end face of the head portion side of each of the tapered rollers 3, 3 and the inner face 7a of the larger flange portion 7 of the inner ring 2.

Meanwhile, in the state where the tapered roller bearing 9 is used, as shown in FIG. 2, the end face on the head portion side of each of the tapered rollers 3, 3 is abutted to the inner face 7a. Accordingly, as shown in FIG. 4, when the tapered roller bearing 9, assembled in the state where the clearance 13 exists between the end face on the head portion side of each of the tapered rollers 3, 3 and the inner face 7a, is installed between the housing 10 and the rotatable shaft 11 as shown in FIG. 2 and used, the tapered rollers 13 in use are moved toward the larger flange portion 7 of the inner ring 2, respectively. As the tapered rollers 13 provided between the outer ring 1 and the inner ring 2 are moved toward the larger flange portion 7, the contact pressure between the rolling surface of the tapered rollers 3, 3 and the outer ring raceway 4 of the outer ring 1 becomes small. This results in that the preload in the tapered roller bearing 9 is short.

In order to prevent the preload from becoming short due to such causes, conventionally, after the tapered rollers bearing 9 is temporarily installed e.g. between the housing 10 and the rotatable shaft 11, the housing 10 is relatively rotated with respect to the rotatable shaft 11, so that the running-in of the tapered roller bearing 9 is conducted. After the end face on the head portion side of the tapered rollers 3, 3 forming the tapered roller bearing 9 is abutted to the larger flange portion 7 during the running-in, the tapered roller bearing 9 is finally installed e.g. between the housing 10 and the rotatable shaft 11 (preloaded).

In addition, Publication of TokuKai Hei 2-256921 discloses an invention to reduce the time and labor required in such running-in. In the invention described in this publication (hereinafter, it is referred to as "previous invention".), as shown in FIG. 5, the size ΔL of the clearance 13 formed between the end face on the head portion side of each of the tapered rollers 3 and the inner face 7a of the larger flange portion 7 when the tapered rollers 3 are arranged in the normal position on the inner ring raceway 5 on the outer peripheral surface of the inner ring 2, and the end face on the tail portion side of the tapered rollers 3 comes into contact with the inner face 6a of the smaller flange portion 6, is controlled. Specifically, the size ΔL of the clearance 13 is up to 0.2 mm (ΔL≦0.2 mm) in the case of the previous invention.

Thus, in the case where the size ΔL of the clearance 13 is up to 0.2 mm, as clear in the description of the publication, the amount of the displacement of the inner ring 2 during the running-in is small, and it reaches in an earlier period a stable state (the state where the end face on the head portion side of each of the tapered rollers 3, 3 comes into contact with the inner face 7a of the lager flange portion 7, so that the inner ring 2 is not displaced any more.). Accordingly, the time and labor required in the running-in are reduced, and it contributes to the cost reduction in the rotating machine and apparatus such as gear box of automobiles in which the tapered roller bearing 3 is installed.

Problems to be solved by the Invention

When the size ΔL of t he clearance 13 is up to 0.2 mm, the running-in is so simplified to intend the cost reduction, but on the contrary, the administration of process precision to limit the ΔL to a small value becomes so inconvenient to increase the cost of the tapered rollers bearing 9 itself. Accordingly, it becomes difficult to sufficiently reduce the cost of gear box.

The present invention was made through experiments repeatedly conducted relating to the previous invention, watching the behavior of the tapered rollers 3, 3 during the running-in of the tapered roller bearing 9 assembled as in FIG. 4, where the technology to simplify the running-in as in the previous invention even if the ΔL is larger than in the case of the previous invention is developed.

Measures to solve the Problems

The tapered roller bearing for an automobile in this invention comprises, as in the conventional tapered roller bearing for an automobile as mentioned above, an outer ring having an outer ring raceway of a tapered concave shape on its inner peripheral surface, an inner ring having an inner ring raceway of a tapered convex shape on its outer peripheral surface, the inner ring raceway having an end portion on the smaller diameter side formed with a smaller flange portion and an end portion on the larger diameter side formed with an larger flange portion, and a plurality of tapered rollers retained and guided by a retainer between the outer ring raceway and the inner ring raceway, and installed in a rotating support portion of the automobile.

Particularly, in the tapered roller bearing for an automobile in this invention, in the case where the tapered rollers are arranged in a normal position on the inner ring raceway of the inner ring, and the end face on the tail portion side of each tapered roller comes into contact with the inner face of the smaller flange portion, the clearance formed between the end face on the head portion side of the each tapered roller and the inner face of the larger flange portion has a size $\Delta L$ the minimum value of which is up to 0.3 mm, and the tapered rollers have the maximum and minimum values in length the difference of which is up to 0.15 mm. Incidentally, this difference is desirably up to 0.1 mm.

Operation

The tapered roller bearing for an automobile in this invention as constructed above is mounted e.g. between a housing and a shaft, so that the both members are rotatable relative to each other, and that the radial load and axial load exerted between the both members are supported, which operation itself is the same as in the conventional tapered roller bearing as mentioned above.

In the tapered roller bearing for an automobile in this invention, also as in the previous invention, the running-in required after the tapered roller bearing is mounted e.g. between the housing and the shaft and before the end face on the head portion side of each tapered roller comes into contact with the inner face of the larger flange portion, can be short, so that the operation to apply a sufficient preload to the tapered roller bearing is easy.

Particularly, in the tapered roller bearing for an automobile in this invention, since in the case where the end face on the tail portion side of each tapered roller comes into contact with the inner face of the smaller flange portion, the clearance formed between the end face on the head portion side of the each tapered roller and the inner face of the larger flange portion has a size $\Delta L$ the minimum value of which is up to 0.3 mm, which is larger than up to 0.2 mm in the previous invention, so that the administration of the process precision to limit the $\Delta L$ to a small value is so easy to intend the cost reduction sufficiently. In addition, the tapered rollers have the maximum and minimum values in length the difference of which is up to 0.15 mm (this difference is desirably up to 0.1 mm.), and therefore even if the minimum value of the size $\Delta L$ is larger, the running-in required for the tapered roller bearing for an automobile to generally be stabilized can be simplified as in the previous invention. Incidentally, to limit the difference in length between the maximum value and the minimum value to be small is easier than to limit the size $\Delta L$ of the clearance to be small.

EMBODIMENTS OF THE INVENTION

The tapered roller bearing for an automobile according to the present invention is, as in the conventional tapered roller bearing 9, comprised of, as shown in FIGS. 1 and 2, an outer ring 1 and an inner ring 2 arranged concentric with each other, and a plurality of tapered rollers 3, 3 rotatebly provided between the outer ring 1 and the inner ring 2. The outer ring 1 has an inner peripheral surface on which an outer ring raceway 4 of a tapered concave shape is formed. And, the inner ring 2 has an outer peripheral surface on which an inner ring raceway 5 of a tapered convex shape is formed, and the inner ring raceway 5 has a smaller flange portion 6 on the end portion on the smaller diameter side and a larger flange portion 7 on the end portion on the larger diameter side. In addition, the tapered rollers 3, 3 are rotatably retained and guided by the retainer 8 between the outer ring raceway 4 and the inner ring raceway 5. This retainer 8 is made of a metal of a cage shape having pockets 12, 12 which are a little smaller than the projected area of the tapered rollers 3, 3, and the retainer 8 has a larger diameter than the pitch circle diameter of the tapered rollers 3, 3. Consequently, in the state where the tapered rollers 3, 3 held by the retainer 8 are mounted outside the inner ring 2, the tapered rollers 3, 3 are not separated from the inner ring 2, so that these members 2, 3 can be handled as a single body.

In addition, in the tapered roller bearing for an automobile in this invention, as shown in FIG. 5, the size $\Delta L$ of the clearance 13 which is formed between the end face on the head portion side of the each tapered roller 3 and the inner face 7a of the larger flange portion 7 in the case where the tapered rollers 3 are arranged in a normal position on the inner ring raceway 5 on the outer peripheral surface of the inner ring 2, and the end face on the tail portion side of each tapered roller 3 comes Into contact with the inner face 6a of the smaller flange portion 6, is controlled. The control of the size $\Delta L$ is similar to that of the previous invention as mentioned above. Particularly, in the present invention, the size $\Delta L$ of the clearance 13 is up to 0.3 mm ($\Delta L \leq 0.3$ mm). In other words, the size $\Delta L$ is a little larger than in the previous invention. Thus, while the size $\Delta L$ of the clearance 13 is made larger, the tapered rollers 3, 3 have the maximum value Lmax and the minimum value Lmin in the length L the difference (Lmax−Lmin) of which is up to 0.15 mm (in addition, this difference is desirably up to 0.1 mm) in the tapered roller bearing for an automobile according to the present invention.

The following is an explanation of the experiments conducted to confirm the effects when the size $\Delta L$ of the clearance 13 is up to 0.3 mm, and simultaneously the tapered rollers 3, 3 have the maximum value Lmax and the minimum value Lmin in the length L the difference (Lmax−Lmin) of which is up to 0.15 mm.

The experiments are carried out, as shown in FIG. 4, by assembling the tapered roller bearing 9 in a state where the end face on the head portion side of each tapered roller 3, 3 does not come into contact with the inner face 7a of the larger flange portion 7 of the inner ring 2, fixing the outer ring 1, so that the assembled tapered roller bearing 9 is held horizontally as shown in the figure, and then measuring the amount of displacement of the inner ring 2 as the inner ring 2 is rotated or rocked. Specifically, when operating the tapered roller bearing 9 as assembled as shown in FIG. 4, corresponding to the motion of the inner ring 2, the inner ring 2 progressively moves downward, the amount of the downward movement is measured and recorded as the displacement amount of the inner ring 2.

For the experiments, a plurality of specimens different in the size $\Delta L$ of the clearance 13 (tapered roller bearings 9) are used, and the running-in is conducted in these specimens, where the number of rotation of the inner ring 2 is measured until the stable state is reached. Based on the experiments, the results as shown in FIG. 6 are obtained. Incidentally, in each specimen, the difference between the maximum value Lmax and the minimum value Lmin in the length L of the tapered rollers 3, 3 is limited up to 0.15 mm (practically up to 0.1 mm). As clear from FIG. 6 showing the experiment results, in the case where the difference in the length L is limited up to 0.15 mm, and simultaneously the minimum value of the size ΔL of the clearance 13 is limited up to 0.3 mm, the number of the running-in can be small similarly, but when the size ΔL of the clearance 13 exceeds 0.3 mm (ΔL>0.3 mm), the number of the running-in required is progressively increased as the size ΔL is increased.

Thus, in this invention, although the size ΔL of the clearance 13 is made a little larger than in the previous invention, the difference between the maximum value Lmax and the minimum value Lmin in the length L of the tapered rollers 3, 3 is limited small, so that the time and labor required for the running-in can be reduced as in the previous invention. The reason for this can be considered from the results of the experiments conducted in the process to complete the present invention and the consideration on the results as follows;

When the running-in of the tapered roller bearing 9 is started from the state of FIG. 4, as the end face on the head portion side of any one 3 of the tapered rollers 3, 3 comes into contact with the inner face 7a of the larger flange portion 7, the stable condition is generally achieved. Accordingly, the size ΔL of the clearance 13 which exists in every one of the tapered rollers 3, 3 must be small in its minimum value. However, when looking at the whole of the tapered roller bearing 9, the end face on the head portion side of all of the tapered rollers 3, 3 must come into contact with the larger flange portion 7, so that the whole tapered roller bearing 9 is sufficiently stabilized. Accordingly, the average and deviation in the size ΔL of the clearance 13 which exists in every one of the tapered rollers 3, 3 must be also small in order to reduce the time and labor required for the running-in. In other words, by making small the dispersion of the length L of the tapered rollers 3, 3, and by making small the difference in size ΔL of the clearance 13 which exists in every one of the tapered rollers 3, 3, the time and labor required for the running-in for the whole tapered roller bearing 9 can be reduced even when the minimum value of the size ΔL is a little larger (up to about 0.3 mm).

Incidentally, in order that the minimum value of the size ΔL of the clearance 13 is limited up to 0.3 mm, the width of the inner ring raceway 5, or the space between the inner face 6a of the smaller flange portion 6 and the inner face 7a of the larger flange portion 7, and so-called the inner ring groove width $W_5$ (FIG. 7) must be finished in a predetermined size (the inner ring groove width $W_5$ is made more precise). Specifically, in order to limit the minimum value of the size ΔL of the clearance 13 up to 0.3 mm, the precision (=dispersion) of the inner ring groove width $W_5$ must be kept smaller than this minimum value (0.3 mm). In working the present invention, by tailoring the reference plane used upon finishing the inner face 7a of the larger flange portion 7, the precision can be improved (the dispersion can be kept small.), and the minimum value of the size ΔL of the clearance 13 can be limited to 0.3 mm or less.

Conventionally, the end face 2a of the inner ring 2 is used as a reference plane in order to finish the inner ring groove width $W_5$ at a predetermined value, as shown in FIG. 8(A). The inner ring groove width $W_5$ is finished at a predetermined value on the basis of the difference ($L_1$–$L_2$) between the distance $L_1$ from the end face 2a to the end portion on the smaller diameter side of the inner raceway 5 (a hypothetical point of intersection between the inner ring raceway 5 and the inner face 6a of the smaller flange portion 6) and the distance $L_2$ from the end face 2a to the end portion on the larger diameter side of the inner raceway 5 (a hypothetical point of intersection between the inner ring raceway 5 and the inner face 7a of the larger flange portion 7), and the inclination angle of the inner ring raceway 5. However, in such a method, errors in the value of the inner ring groove width $W_5$ obtained are inclined to be accumulated. Therefore, when the inner ring groove width $W_5$ is set in the state practically suitable to mass production, the error of the inner ring groove width $W_5$ is about 0.4 mm.

On the other hand, in the case of working the present invention, as shown in FIG. 8(B), the end portion on the smaller diameter side of the inner ring raceway 5 is used as a reference plane, the distance $L_3$ between the end portion on the smaller diameter side and the end portion on the larger diameter side of the inner ring raceway 5 is determined, and the inner ring groove width $W_5$ is finished at a predetermined value based on the distance $L_3$ and the inclination angle of the inner ring raceway 5. In this method, errors in the value of the inner ring groove width $W_5$ obtained are hardly accumulated. Therefore, even when the inner ring groove width $W_5$ is set in the state practically suitable to mass production, the error of the inner ring groove width $W_5$ can be kept about 0.2 mm.

EFFECTS OF THE INVENTION

The tapered roller bearing for an automobile according to the present invention constructed and operated as mentioned above, is simple in construction and not high in production cost, and in addition the running-in required to keep enough preload can be small in amount. Therefore, the operation to assemble various rotating machine and apparatus such as gear box having the tapered roller bearing installed therein can be efficient. In addition, the error in size in parts is made in a degree sufficiently realizable in the process suitable to mass production, so that the sufficient cost reduction can be achieved.

BRIEF DESCRIPTION OF THE DRAWINGS

FIG. 4A cross sectional view of a tapered roller bearing for an automobile assembled but not completed in running-in.

Figure 1:
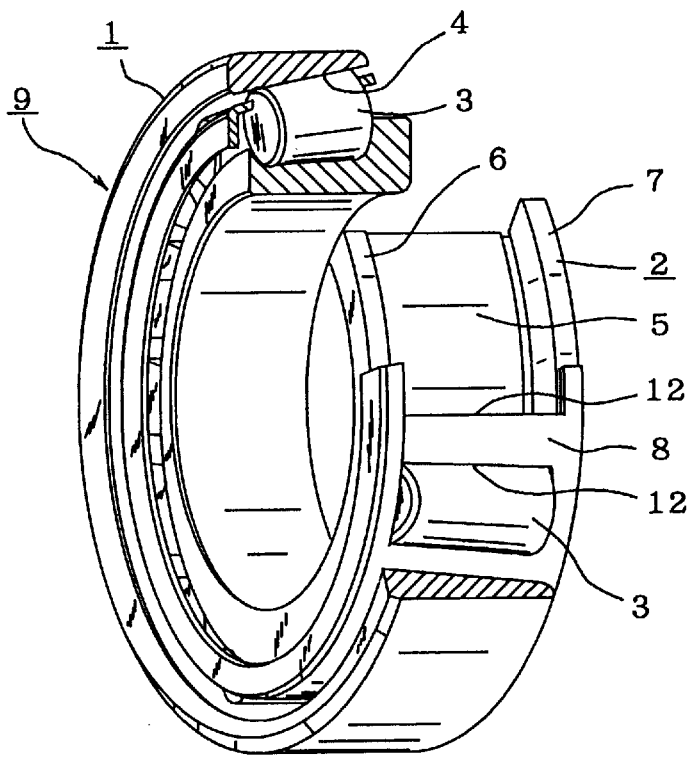
FIG. 1A partially cut away perspective view of a tapered roller bearing for an automobile to which the present invention is applied.
Figure 2:
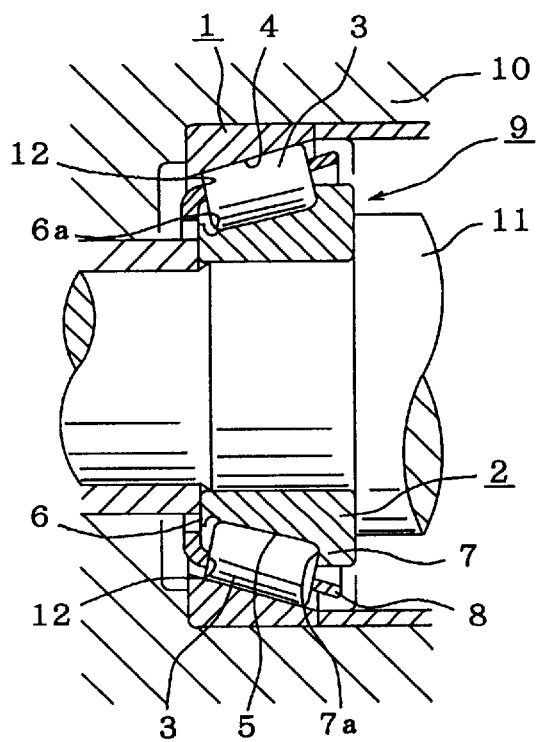
FIG. 2A cross sectional view of an example of the tapered roller bearing for an automobile in use.
Figure 3:
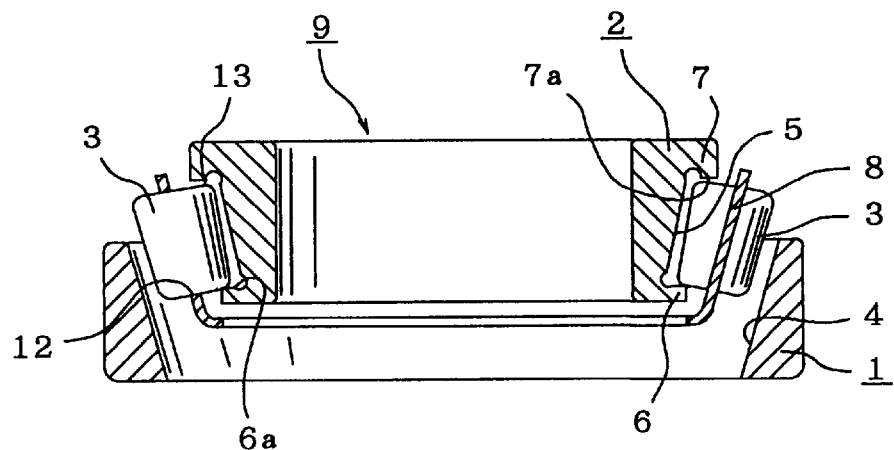
FIG. 3A cross sectional view of a tapered roller bearing for an automobile during assembling.
Figure 4:
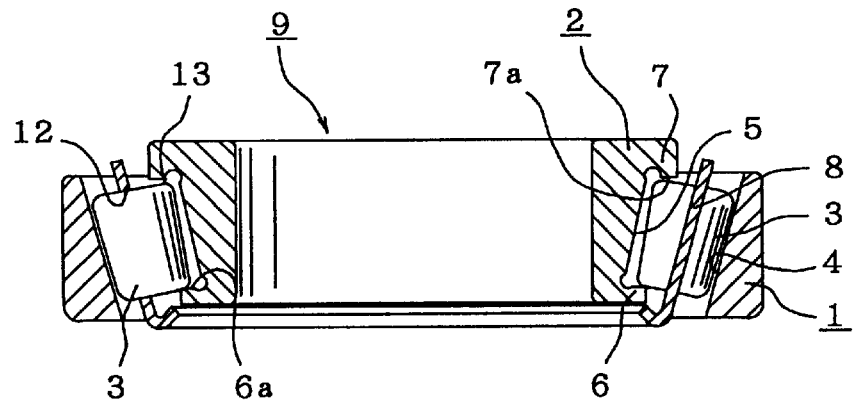
Figure 5:
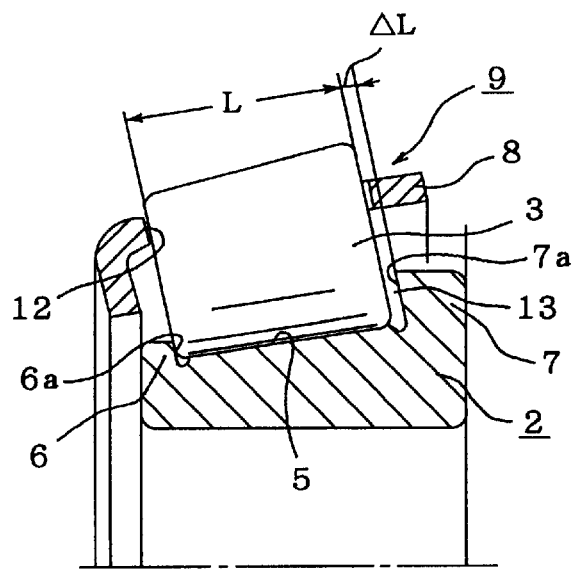
FIG. 5A partial cross sectional view to explain the tapered roller bearing of the previous invention and the present invention.
Figure 6:
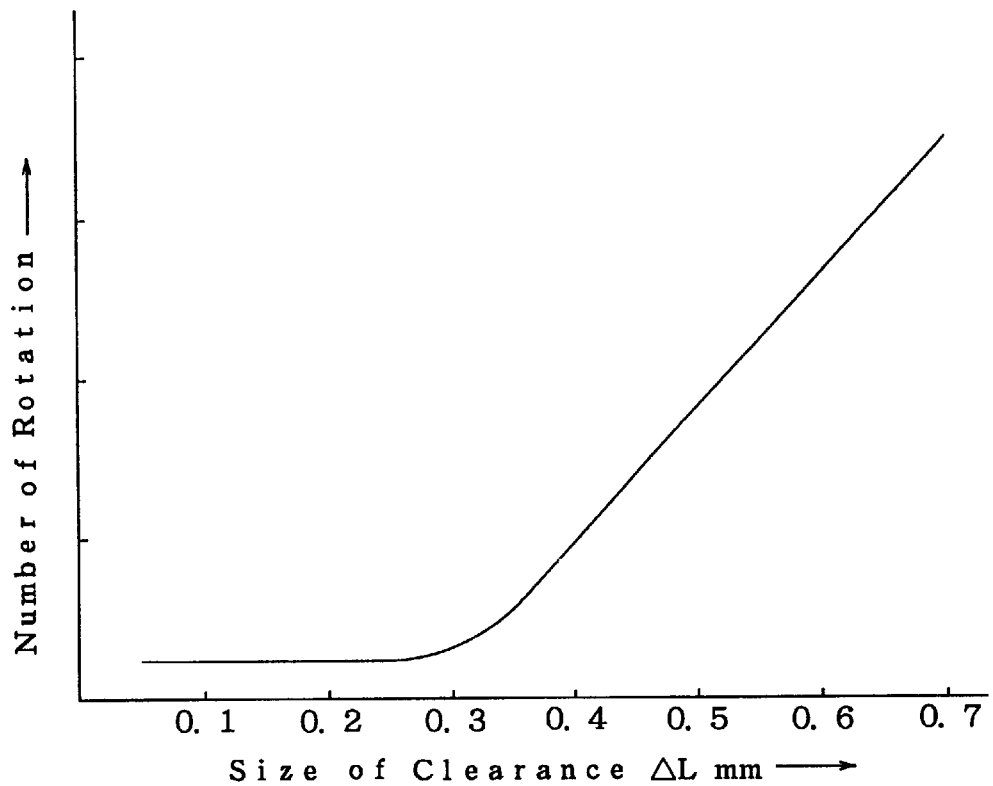
FIG. 6A diagram to show the results of experiments conducted to confirm the effects of the present invention.
Figure 7:
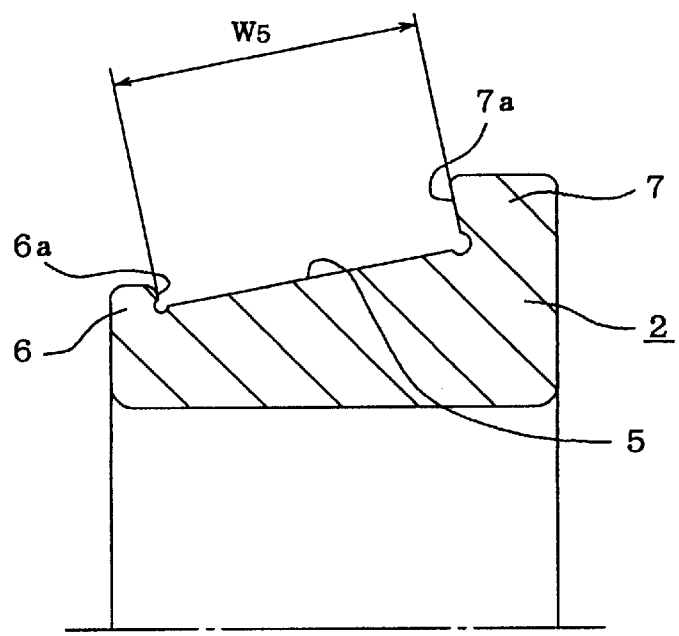
FIG. 7A cross sectional view to explain the groove width size.
Figure 8:
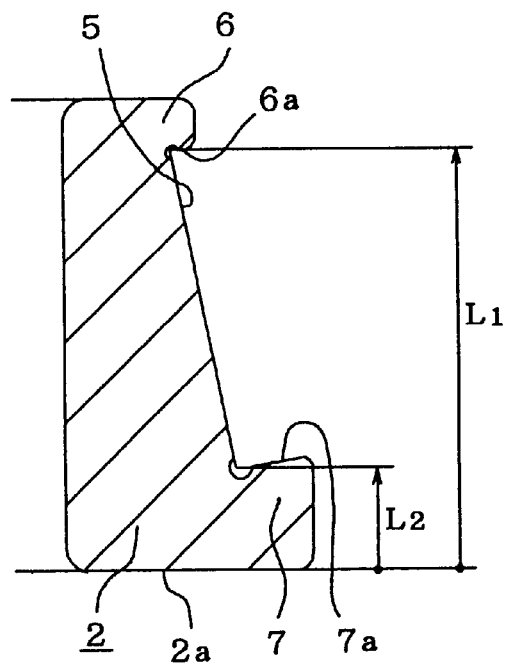
FIG. 8A cross sectional view showing two examples to limit the groove width size.
Figure 8:
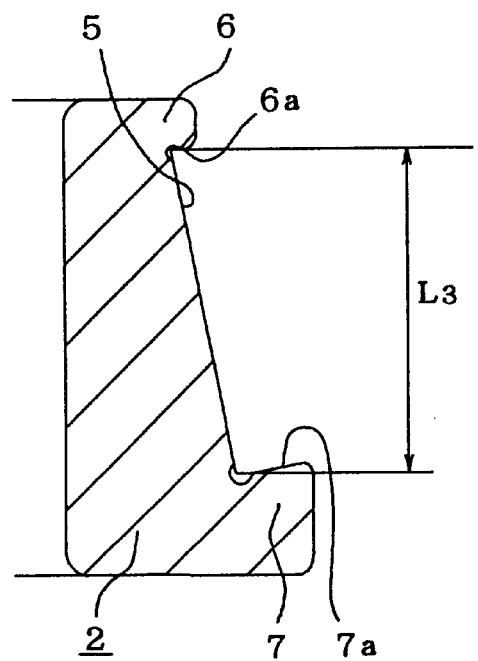

SYMBOLS 1. outer ring
2. inner ring 2a. end face
3. tapered roller
4. outer ring raceway
5. inner ring raceway
6. smaller flange portion
6a. inner face
7. larger flange portion
7a. inner face
8. retainer
9. tapered roller bearing
10. housing
11. rotatable shaft
12. pocket
13. clearance

We claim:

1. A tapered roller bearing for an automobile comprising an outer ring having an inner peripheral surface on which an outer ring raceway of a tapered concave shape is formed, an inner ring having an outer peripheral surface on which an inner ring raceway of a tapered convex shape is formed, the inner ring raceway having an end portion on the smaller diameter side formed with a smaller flange portion and an end portion on the larger diameter side formed with a larger flange portion, and a plurality of tapered rollers retained and guided by a retainer between the outer ring raceway and the inner ring raceway, when the tapered rollers are arranged in a normal position on the inner ring raceway of the inner ring, and the end face on the tail portion side of each tapered roller comes into contact with the inner face of the smaller flange portion, a clearance formed between the end face on the head portion side of the each tapered roller and the inner face of the larger flange portion has a size $\Delta L$ the value of which is up to 0.3 mm, and the tapered rollers have maximum and minimum values in lengths the difference of which is not greater than 0.15 mm.

* * * * *